United States Patent [19]

Greenberg

[11] 4,243,525

[45] Jan. 6, 1981

[54] METHOD FOR REDUCING THE FORMATION OF TRIHALOMETHANES IN DRINKING WATER

[75] Inventor: Edward S. Greenberg, East Windsor, N.J.

[73] Assignee: FMC Corporation, Philadelphia, Pa.

[21] Appl. No.: 25,179

[22] Filed: Mar. 29, 1979

[51] Int. Cl.³ .............................. C02F 1/72; C02F 1/76
[52] U.S. Cl. .................................... 210/754; 210/759; 210/764
[58] Field of Search ..................... 210/50, 62, 63 R, 61

[56] References Cited

U.S. PATENT DOCUMENTS

| 1,078,918 | 11/1913 | Gruter | 210/62 |
| 2,272,223 | 2/1942 | Pietzsch | 210/62 |
| 3,781,200 | 12/1973 | Hicks | 210/62 |
| 3,970,554 | 7/1976 | Fischer et al. | 210/62 |

FOREIGN PATENT DOCUMENTS

| 2443680 | 3/1975 | Fed. Rep. of Germany | 210/63 R |
| 51-26757 | 3/1976 | Japan | 210/50 |
| 3529 | 9/1913 | United Kingdom | 210/61 |
| 604804 | 7/1948 | United Kingdom | 210/61 |
| 468896 | 9/1975 | U.S.S.R. | 210/62 |
| 552302 | 7/1977 | U.S.S.R. | 210/50 |

OTHER PUBLICATIONS

Burton B. D. et al., "Hydrogen Peroxide As A Treatment For Disinfection And Reduction Of Trihalomethanes Formation In Potable Waters"; Louisville Water Co., Mar. 1978.
Duke D. T., "Control Of Trihalomethanes In Drinking Water"; Presented at the 50th Annual Conf. Ky-Tenn. Section Am. Water Works Assoc., Nov. 1978.
Rook J. J., "Chlorination Reactions Of Fulvic Acids In Natural Waters", Env. Science of Tech., vol. 11, pp. 478-482 (1977).
Stevens A. A., "Measurement of Trihalomethane and Precursor Concentration Changes", J.A.W.W.A., vol. 69, pp. 546-554 (1977).
Rook J. J., "Haloforms in Drinking Water", J.A.W.-W.A. pp. 168-172, (Mar. 1976).

*Primary Examiner*—Benoit Castel
*Attorney, Agent, or Firm*—Robert W. Kell; Frank Ianno

[57] ABSTRACT

The level of trihalomethanes in drinking water is reduced by adding hydrogen peroxide to the water prior to chlorination.

5 Claims, 2 Drawing Figures

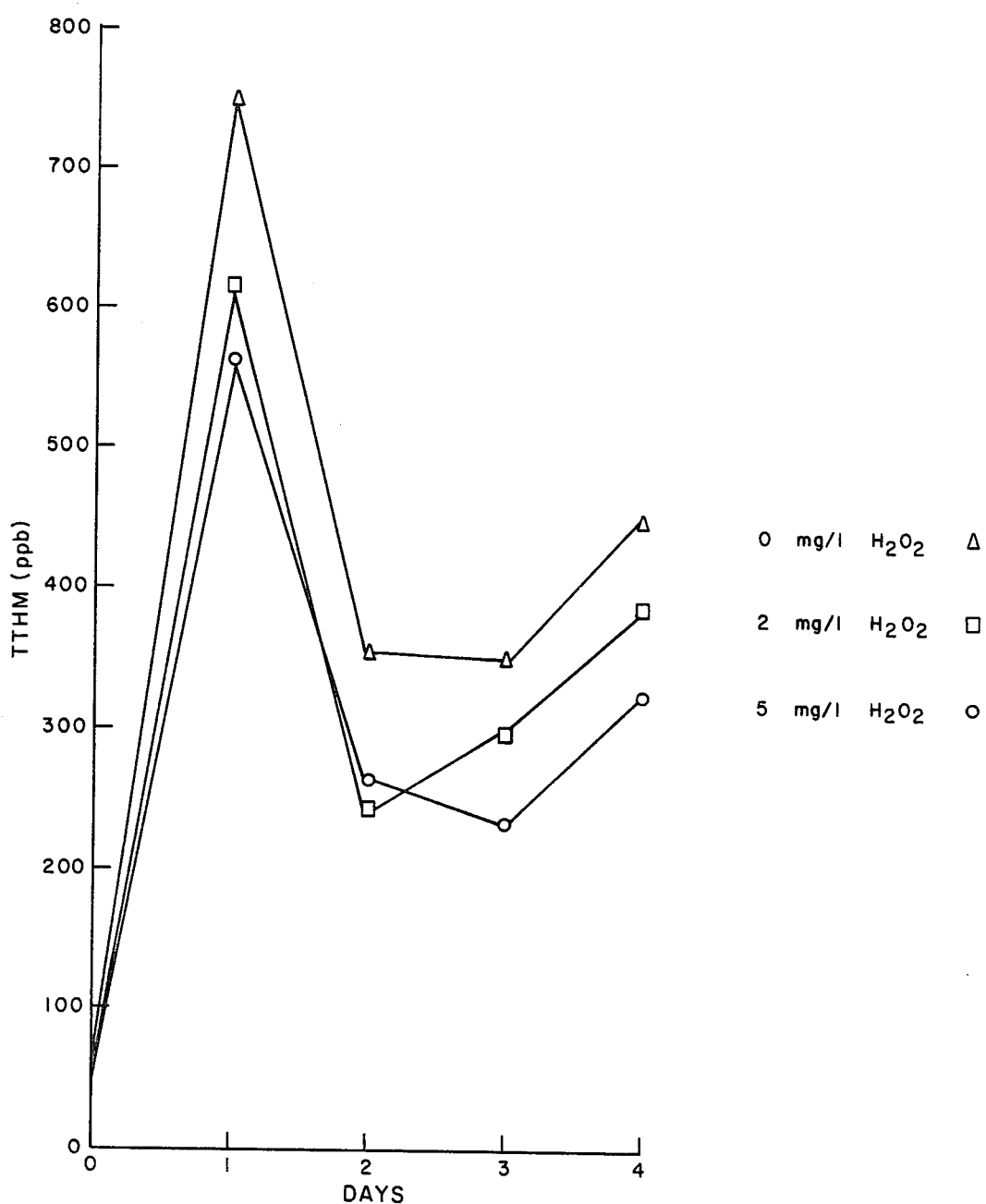
FIG.-1 FLORIDA GROUND WATER-TOTAL TRIHALO METHANES

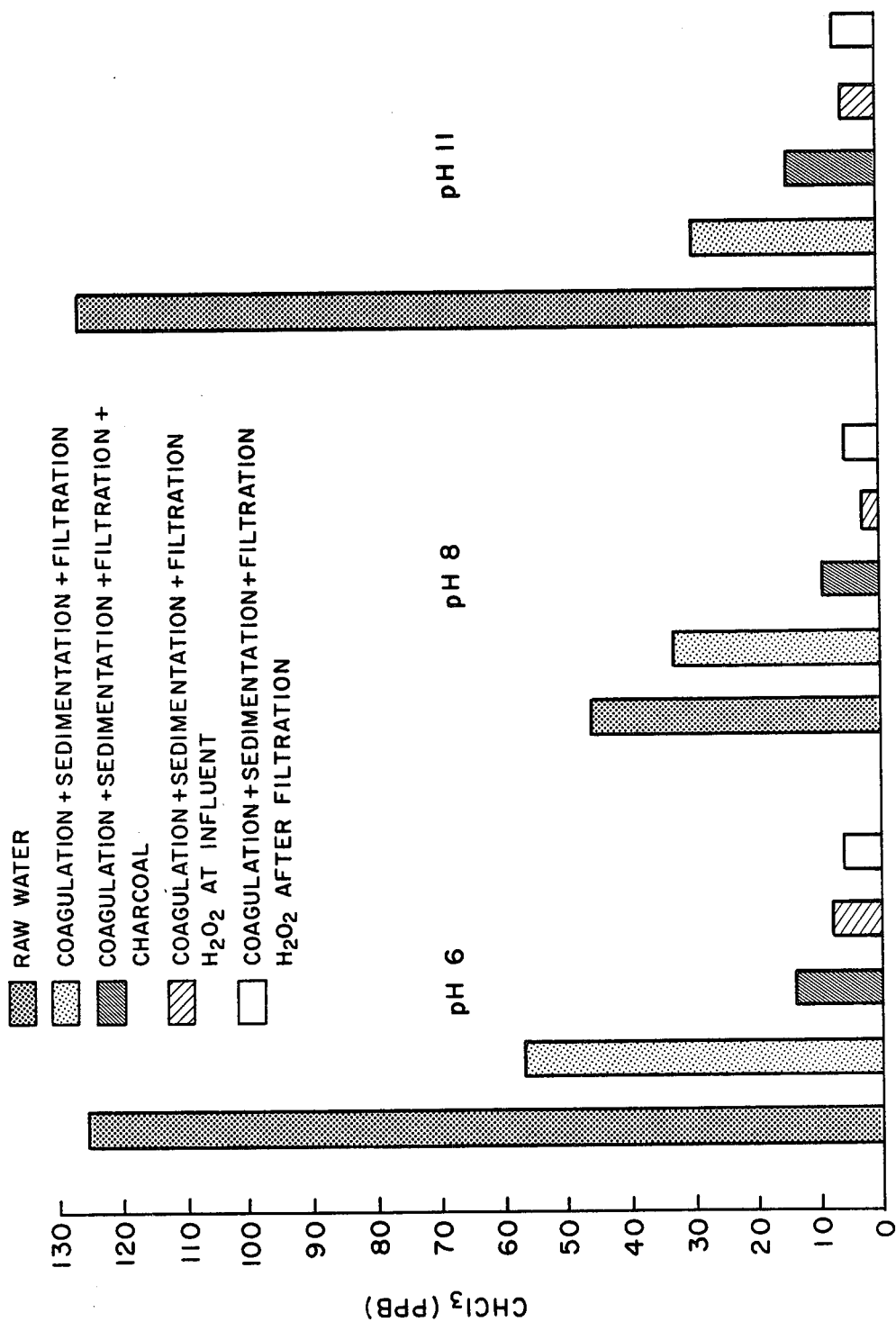

METHOD FOR REDUCING THE FORMATION OF TRIHALOMETHANES IN DRINKING WATER

It has recently been established that the chlorination of drinking water for disinfection purposes results in the formation of chlorinated organic compounds, some of which are toxic. Of particular concern are those compounds collectively known as trihalomethanes. The most widely found trihalomethane is chloroform (CHCl$_3$) followed by dichlorobromomethane (CHCl$_2$Br), dibromochloromethane (CHClBr$_2$), and bromoform (CHBr$_3$). The iodo homologues are not generally found in treated water.

With the advent of improved analytical methods, it has been shown that the presence of trihalomethanes in drinking water is widespread throughout the United States, although the level of such contamination varies greatly with the source of the water.

The United States government has recently passed legislation concerning the levels of various specific trihalomethanes in potable water. This legislation may restrict the total trihalomethane level (the algebraic sum of the four main components) to no more than 100 parts per billion.

There appears to be some controversy as to what the primary precursors of trihalomethanes are, but it is generally held that the naturally occurring humic and fulvic acids are involved. These molecules are the degradation products of soil, trees, leaves, grass and many other common organic materials. The molecules are extremely complex and contain varied functional groups including phenol, carboxylic acid, aldehyde, and alcohol radicals. Dr. J. J. Rook has published "Chlorination Reaction of Fulvic Acids in Natural Waters" in Environmental Science and Technology, 11, pages 478–482, 1977. Dr. Rook has postulated that the mechanism of trihalomethane formation involves chlorine attack of the meta-hydroxyphenolic functions known to be present in the humates.

The treatment of water to be used for human consumption purposes can vary greatly due to the nature and quality of the raw water source. The treatment can be as simple as low level chlorination only for disinfection or it can be extremely involved for waters that are polluted or naturally contaminated by routine environmental conditions. A more involved treatment may include prechlorination, coagulation, softening, sand or mixed media filtration, post-chlorination and finally dechlorination. The use of activated charcoal, potassium permanganate or chlorine dioxide may also be included in treating water for human consumption.

Ozone and chlorine have been used by water utilities in the Federal Republic of Germany to treat water. J. Am. Water Works Assoc. 70, 326–331, 1978; W. Kuhn et al. The Columbus, Ohio water treatment plant and the Louisville Water Company have investigated the use of hydrogen peroxide in the treatment of water. U.S. Pat. No. 1,078,918 describes the treatment of sterilized water with hydrogen peroxide or other peroxides.

In accordance with the present invention, hydrogen peroxide is first added to raw water at levels of from 0.1 to 50 parts per million, preferably 1 to 10 parts per million. The point of addition need not be at the raw water intake, although it must occur prior to the point of first chlorine addition. A reaction time of from ½ hour to 24 hours has been used, but a shorter time or a longer time is also effective in reducing the level of trihalomethane compounds. The temperature and pH of the water do not appear to be critical.

It has been found that hydrogen peroxide per se is not adequate for complete disinfection of drinking water. It is also known that chlorine and hydrogen peroxide react according to equation:

$$HOCl + H_2O_2 \rightarrow O_2 + H^+ + Cl^- + H_2O$$

After treatment with hydrogen peroxide to oxidize organic substances present in the water, sufficient chlorine is added in the second step of the present invention to react with any hydrogen peroxide remaining and maintain a residual amount of chlorine that is sufficient to disinfect the water.

It is an advantage of the present invention that hydrogen peroxide is easily shipped, stored and handled in large or small quantities. It decomposes to water and oxygen, leaving no harmful by-products. The large capital investment is not required to install and operate the water treatment system of the present invention and it reduces the level of trihalomethanes that may be formed during disinfection with chlorine. The invention will be better understood from the following examples wherein:

FIG. 1 is a graph which illustrates the reduction of trihalomethanes in water that has been treated with hydrogen peroxide prior to chlorination, and FIG. 2 is a bar graph which illustrates the effects of pH and the point of addition of hydrogen peroxide upon the chloroform present in chlorinated water.

In the examples which follow, all parts are given by weight unless otherwise noted.

EXAMPLE I

The chlorine demand of Florida ground water is determined by adding an excess of a standarized chlorine solution to an aliquot of the water and colorimetrically measuring the free chlorine residue after three days. The method of analysis used is specific for free chlorine and is described by R. Bauer and C. O. Rupe, Analytical Chemistry 43, 421–425 (1971). The three day chlorine demand of Florida ground water is fourteen milligrams per liter.

To three 1.5 liter samples of Florida ground water in three round bottom flasks is added 25 milliliters of pH 8.0 phosphate buffer (1% solution) followed by 0, 50 and 125 milligrams respectively of 6% hydrogen peroxide (0, 2 and 5 milligrams per liter). The three mixtures are allowed to stir for approximately one hour and 0.3 grams of alum [Al$_2$(SO$_4$)$_3$.14.3H$_2$O] is added to each of the samples and the pH adjusted to 8.0 with 5 Normal sodium hydroxide. Rapid initial mixing is followed by slow stirring for floc formation. The floc is allowed to settle, and the samples filtered through a mixed media filter of sand and anthracite coal. An aliquot of each filtered water sample is taken and titrated for residual peroxide using the titanium sulfate colorimetric method of analysis as described by Snell and Snell, Colorimetric Methods of Analysis, Third Edition, Volume 2, Van Nostrand, New York (1955) page 882. The residue peroxide levels after filtration, are 0, 1.5, and 4.6 milligrams per liter respectively.

To each of the three samples is added a standard solution of chlorine in an amount determined by adding the three day chlorine demand of the raw water (14 milligrams per liter) plus the amount of chlorine that will react with residual hydrogen peroxide and increasing this amount sufficiently to assure the presence of free chlorine throughout the test.

The amount of chlorine added to each of the three samples is 24, 28 and 34 parts per million respectively.

Immediately upon addition of the chlorine and rapid mixing the water is poured carefully into glass septum vials that have been previously baked at greater than 500° C. overnight. The vials are sealed head-space free with Teflon ® lined septa and allowed to remain at room temperature for various periods of time. At appropriate intervals the vials are opened and the contents carefully transferred into smaller vials containing 0.1 ml of 10% sodium thiosulfate to destroy any remaining free chlorine. The concentration of chlorine remaining in the initial vial is measured as a check that the demand calculations are valid.

The vials which now contain the sample treated with sodium thiosulfate are held upside down and injected with ten milliliters of nonane. A double syringe technique is used so that the nonane will displace an equal volume of water without having to open the vial to the atmosphere. The vials are shaken vigorously and allowed to achieve equilibrium prior to analysis by electron capture gas chromatography. Triplicate samples are run each time for statistical purposes.

The concentration of each component in the original aqueous phase is calculated from the gas chromatography data, the partition coefficient of the nonane-water system (measured with respect to each of the trihalomethane components) and the relative amounts of nonane and water in each sample vial.

The chlorine levels after 24 hours are 5, 6 and 5 parts per million respectively.

The chlorine levels after 48 hours are 6, 5 and 4 parts per million respectively.

The chlorine levels after 72 hours are 6, 4 and 3 parts per million respectively.

The chlorine levels after 96 hours are 6, 3 and 2 parts per million respectively.

The results of the trihalomethane analysis described in this example are summarized in the following Table and illustrated by FIG. 1.

TABLE

Florida Ground Water
Total Trihalomethane (TTHM) Levels (ppb)

| DAYS | Hydrogen Peroxide | | |
|---|---|---|---|
| | 0 mg/l | 2 mg/l | 5 mg/l |
| 0 | 68 ± 5 | 49 ± 4 | 51 ± 2 |
| 1 | 755 102 | 616 ± 24 | 565 ± 97 |
| 2 | 353 ± 11 | 239 ± 83 | 261 ± 37 |
| 3 | 349 ± 38 | 295 ± 22 | 233 ± 14 |
| 4 | 454 ± 96 | 388 ± 22 | 328 ± 32 |

Example I is repeated except that a larger amount of hydrogen peroxide (10 milligrams per liter) is added to a 1.5 liter sample of Florida ground water buffered at pH 8.0 and 44 parts million of chlorine are added ½ hour after addition of the hydrogen peroxide. In yet another experiment, Example I is repeated except that a smaller amount of hydrogen peroxide (1 milligram per liter) is added to a 1.5 liter sample of Florida ground water buffered at pH 8.0 and 26 parts per million of chlorine are added 24 hours after addition of the hydrogen peroxide. In each instance the level of trihalomethanes is reduced by adding hydrogen peroxide to the water prior to chlorination.

EXAMPLE II

The effect of adding hydrogen peroxide at different stages in the purification of water from the Delaware-Raritan Canal was determined in a series of experiments. In each experiment the method of purification was similar to that described in Example I above.

In Runs A, B, and C, 1.5 liters of raw Delaware-Raritan Canal water is adjusted to pH 6.0, 8.0 and 11.0 respectively with sulfuric acid or sodium hydroxide and sufficient hypochlorite solution added to give an initial free chlorine level of 5 milligrams per liter. After 24 hours the remaining free chlorine is destroyed with 0.1 ml of 1% sodium bisulfite and the chloroform content of the water sample determined by the method described under Example I above except that an equal amount of pentane was substituted for the nonane for extraction. The chloroform content of Run A (pH 6.0) is 125 parts per billion, that of Run B (pH 8.0) is 46 parts per billion and that of Run C (pH 11.0) is 127 parts per billion.

In Runs D, E and F, 1.5 liters of raw Delaware-Raritan Canal water is adjusted to pH 6.0, 8.0 and 11.0 respectively and 39 milligrams of alum $[Al_2(SO_4)_3 \cdot 14.3H_2O]$ is added with stirring to each of the samples. The floc is allowed to settle and the sample filtered through a mixed media filter of sand and anthracite coal. A hypochlorite solution is added to the filtered samples to give a level of 5 parts per million free chlorine. After 24 hours the remaining free chlorine is destroyed with 0.1 ml of 1% sodium bisulfite and the chloroform content of each water sample determined by the method described above in this Example. The chloroform content of Run D (pH 6.0) is 57 parts per billion, that of Run E (pH 8.0) is 33 parts per billion and that of Run F (pH 11.0) is 29 parts per billion.

In Runs G, H and I, 1.5 liters or raw Delaware-Raritan Canal water is adjusted to pH 6.0, 8.0 and 11.0 respectively and the water samples are treated with alum and filtered as described above with respect to Runs D, E and F. After the floc settles and the samples are filtered through sand and anthracite coal, each sample is filtered through charcoal. Sufficient hypochlorite solution is added to provide each filtered sample a chlorine level of 5 parts per million free chlorine. After 24 hours the remaining free chlorine is destroyed with 0.1 ml of 1% sodium bisulfite and the chloroform content of the water sample determined by the method described above in this Example.

The chloroform content of Run G (pH 6.0) is 14 parts per billion, that of Run H (pH 8.0) is 9 parts per billion and that of Run I (pH 11.0) is 14 parts per billion.

In Runs J, K and L, 1.5 liters of raw Delaware-Raritan Canal water is adjusted to pH 6.0, 8.0 and 11.0 respectively and the water samples are treated with 1,075 milligrams of 6% hydrogen peroxide to provide a hydrogen peroxide level of 43 milligrams per liter. The water samples are stirred for approximately one hour. Thirty-nine milligrams of alum $[Al_2(SO_4)_3 \cdot 14.3H_2O]$ are added to each of the samples, and the pH of each sample is maintained at the desired pH with sulfuric acid or sodium hydroxide. Rapid initial mixing is followed by slow stirring to allow for floc formation. The floc is allowed to settle and the samples filtered through a mixed media filter of sand and anthracite coal. Sodium hypochlorite is added to provide the filtered samples with a free chlorine level of 5 parts per million and the pH maintained at the initial value by the addition of sulfuric acid or sodium hydroxide, as required. After 24 hours the remaining free chlorine is destroyed with 0.1 milliliters of 1% sodium bisulfite, and the chloroform content of the water sample determined by the method described above in this Example.

The chloroform content of Run J (pH 6.0) is 8 parts per billion, that of Run K (pH 8.0) is 3 parts per billion and that of Run L is 5 parts per billion.

In Runs M, N and O, 1.5 liters of raw Delaware-Raritan Canal Water is adjusted to pH 6.0, 8.0 and 11.0 respectively and coagulation, sedimentation and filtration is carried out as described above with respect to Runs D, E and F. After filtration 1,075 milligrams of 6% hydrogen peroxide is added to each water sample to provide a hydrogen peroxide level of 43 milligrams per liter. The water samples are stirred for approximately one hour and the pH is maintained at the initial value by addition of sulfuric acid or sodium hydroxide as required. Sufficient sodium hypochlorite is added to provide a free chlorine level in each water sample of 5 parts per million. After 24 hours the remaining free chlorine is destroyed with 0.1 milliliters of 1% sodium bisulfite and the chloroform content of each water sample determined by the method described above in this Example.

The chloroform content of Run M (pH 6.0) is 6 parts per billion, that of Run N (pH 8.0) is 5 parts per billion and that of Run O (pH 11.0) is 7 parts per billion.

The amounts of chloroform present in Runs A-O are illustrated in FIG. 2. Chloroform is the major trihalomethane constituent in chlorinated water and is representative of the total amount of trihalomethane found therein.

I claim:

1. A method of treating water to disinfect the water and reduce the formation of trihalomethanes which comprises first adding to the water from about 0.1 to about 50 parts per million hydrogen peroxide to oxidize organic substances present therein and thereafter adding to the water sufficient chlorine to react with any hydrogen peroxide present and maintain a residual amount of chlorine sufficient to disinfect the water, whereby the formation of trihalomethanes present in the water amounts to less than 295 parts per billion.

2. The method of claim 1 wherein the chlorine is added from about 0.5 to about 24 hours after addition of the hydrogen peroxide.

3. The method of claim 1 wherein the amount of hydrogen peroxide added to the water is from about 1 to about 10 parts per million.

4. The method of claim 1 wherein the formation of trihalomethanes present in the water amounts to less than 100 parts per billion.

5. The method of claim 1 wherein said hydrogen peroxide is added subsequent to a coagulation step.

* * * * *